March 9, 1926. 1,576,471
T. RIGBY
EVAPORATOR FOR CONCENTRATING OR DRYING
Filed Nov. 23, 1921  4 Sheets-Sheet 1

Inventor
Thomas Rigby
by Wilkinson & Giusto
Attorneys

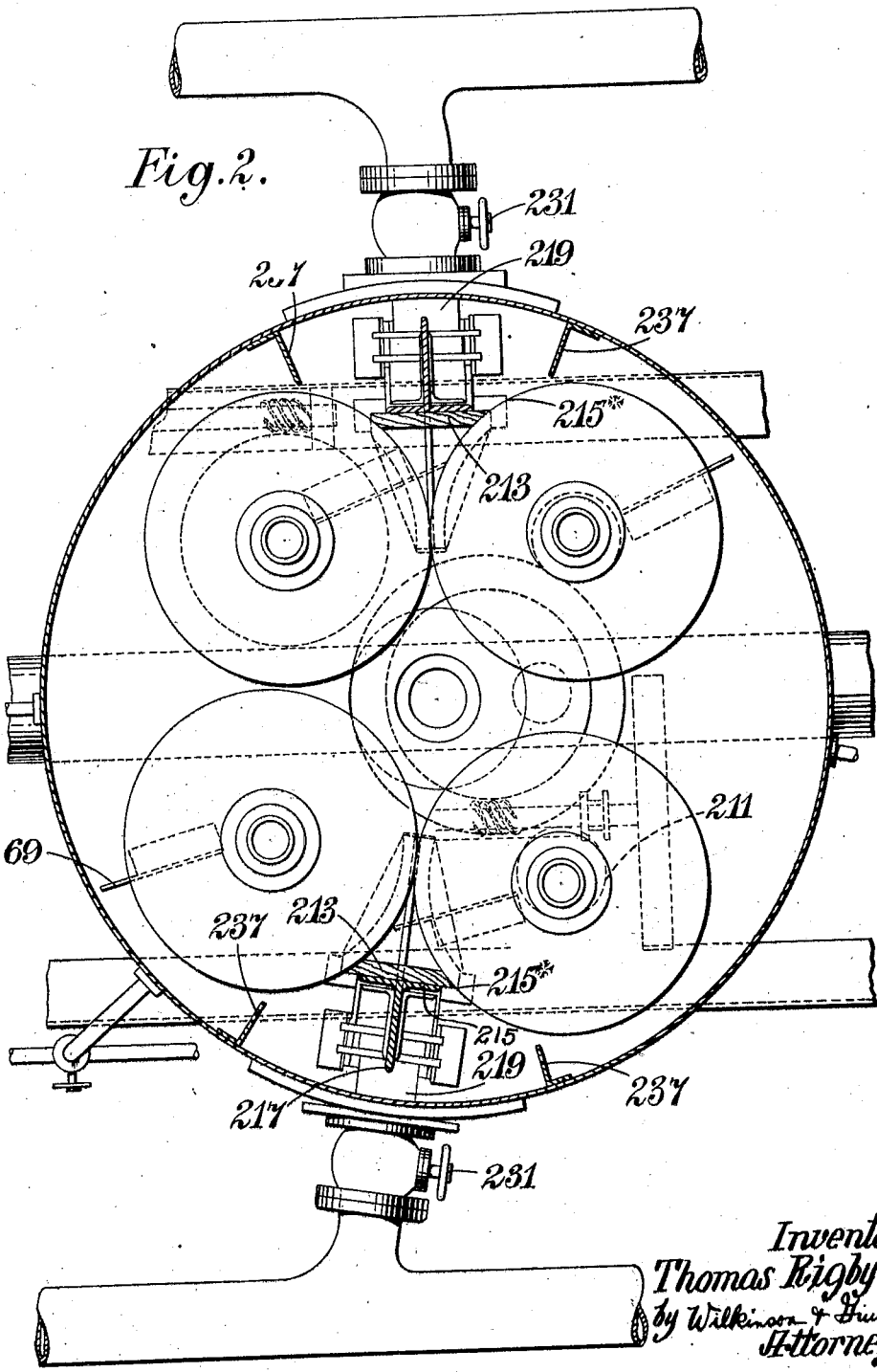

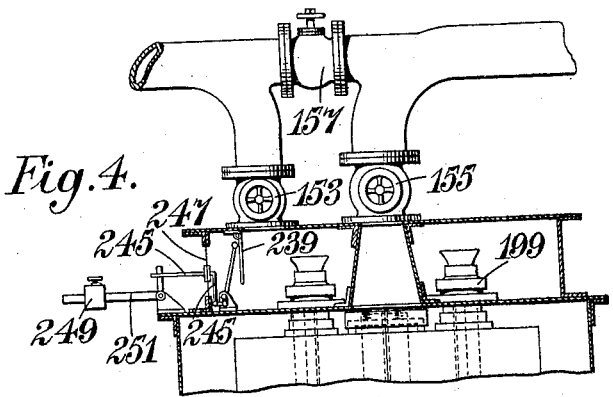
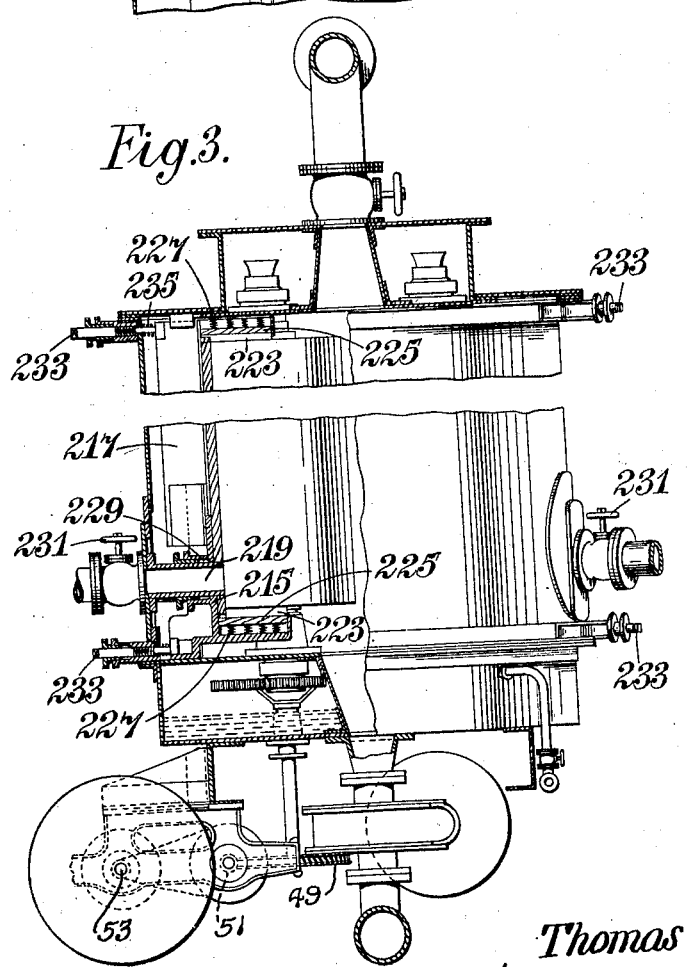

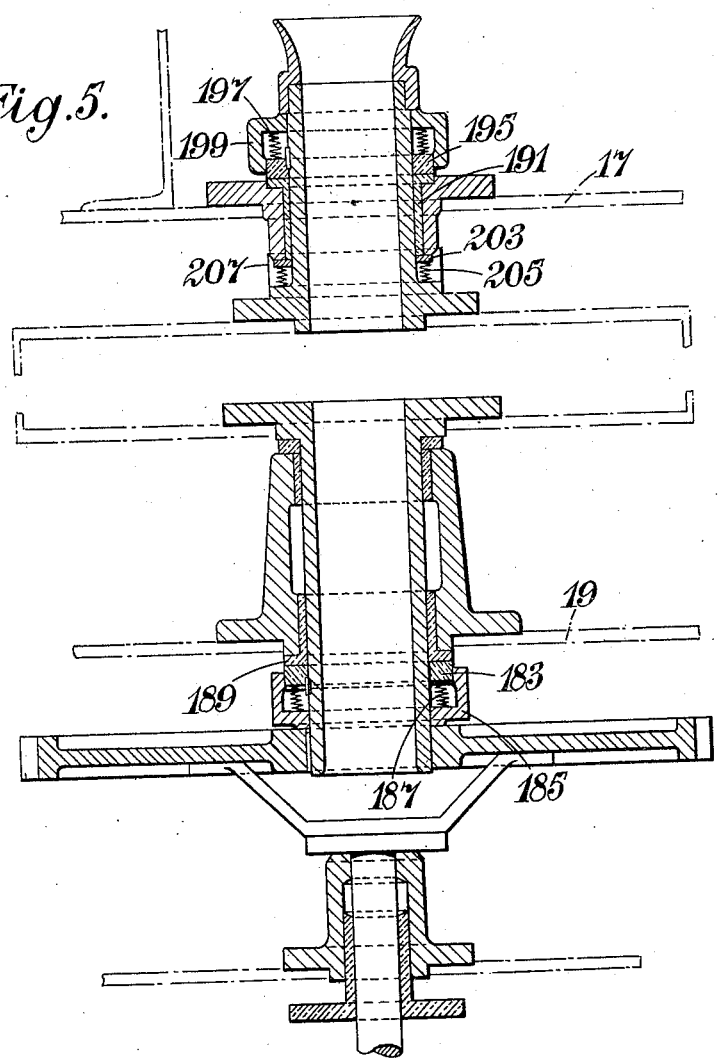

Patented Mar. 9, 1926.

1,576,471

UNITED STATES PATENT OFFICE.

THOMAS RIGBY, OF LONDON, ENGLAND.

EVAPORATOR FOR CONCENTRATING OR DRYING.

Application filed November 23, 1921. Serial No. 517,299.

*To all whom it may concern:*

Be it known that I, THOMAS RIGBY, a subject of the King of England, residing in London, England, have invented certain new and useful Improvements in Evaporators for Concentrating or Drying, of which the following is a specification.

This invention relates to concentration and drying plant and particularly to plant for the drying of pulped peat (containing say 90% of water), of sewage sludge, and of other thick or semi-fluid water-containing materials which neither are easily affected deleteriously by heat, nor, owing to their not being or becoming concentrated solutions, impose a high temperature difference between the heating medium and the boiling point of the water, but on the other hand owing to the comparatively low value of the dry material and the substantial water content must be dried by highly economical methods.

The invention aims at providing a highly economical apparatus for drying such material and is based in part upon the observation that such materials as are particularly in question will, provided they be spread in a sufficiently thin film upon a heating surface, allow of a comparatively high evaporative efficiency being obtained from a heating surface of given area with quite a low temperature difference (some 5° to 10° C. is what I generally contemplate the use of in accordance with the invention) between vapor evolved from the material and the heating medium.

One feature of the invention is concerned with plant for drying thick or semi-fluid suspensions, pulps and the like wherein the fluid or semi-fluid material to be dried is fed parallel in thin films on to drying surfaces arranged in a number of drying chambers connected to operate in multiple effect and is left undisturbed upon such surfaces until removed therefrom, and from the chambers, as a solid product substantially of the desired final dryness to which the same is to be brought by the film drying devices of that plant. The final products from the separate chambers may be mingled or not as desired.

The drying surfaces used preferably will take the form of rotary drums the axes of which may be horizontally inclined, or vertical, but preferably the latter.

I will now describe by way of example one form of plant according to the invention and will then particularly point out the features of the invention in the appended claims.

In the drawings;

Figure 2 is a sectional plan of one effect of a plant of the nature indicated generally in Figure 1;

Figure 3 is a part sectional elevation of the effect shown in Figure 2;

Figure 4 is a part sectional elevation of the upper portion of the effect of Figure 2 and viewed at right angles to Figure 3; and Figure 5 shows in sectional elevation the details of the upper and lower drum spindles, glands and bearings of the effect of Figure 2.

Figure 1:
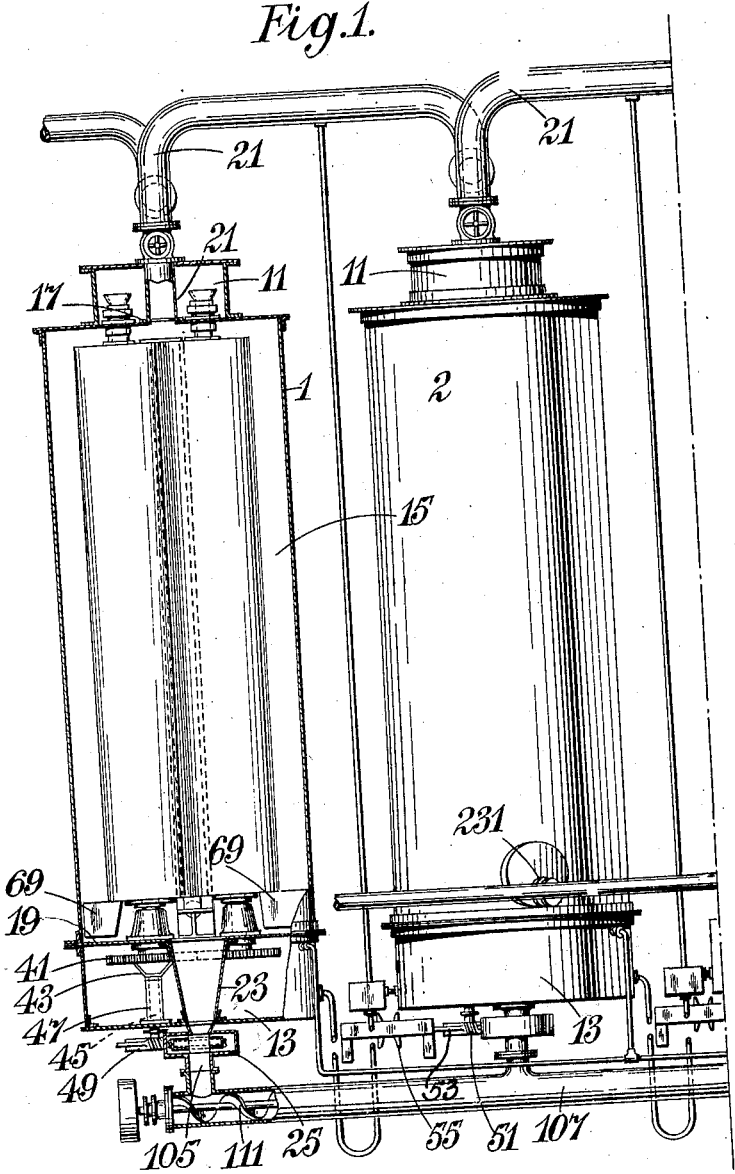
Figure 1 shows in side elevation and in partial section two of several effects comprised in one form of plant according to the invention.

In Figure 1 of the drawings, 1, and 2, respectively indicate the casings of the correspondingly positioned effects of the several effects which operate in multiple effect. The number of effects used may vary widely but generally will exceed two. Each effect comprises upper and lower chambers 11 and 13 separated from the main vapor space 15 by partitions 17, 19. The upper and lower portions of the structure are stiffened respectively by the lower portion of the vapor outlet duct 21 leading from the space 15 to the chamber 11 of the next effect (and having a flanged connection with the partition 17 and with the cover of the chamber 11) and by the duct 23 passing from the bottom partition 19 to the bottom plate of the casing to lead dried product to an automatic discharger 25. The portion of the duct 21 which passes through the chamber 11 and the duct 23 are coaxial with the casing. Around the inner wall of the casing is a group of drying drums the spindles of which are carried in bearings secured in the partitions 17 and 19. The heating steam for the effect enters the chamber 11 through the valve 153 (Figure 4) and passes through the hollow upper spindle into the drum the condensed steam draining through the hollow lower spindle into the chamber 13.

Each drum spindle bearing is preferably sealed by a spring-pressed washer (see 195, 183 in Figure 5) rotating with the spindle on that end of it projecting into the chamber 11 or 13 as the case may be. In Figure will be seen the springs 187 in the cap 185 (fast on the lower spindle) which press the carefully finished face of the washer 183 up against the plane face of the bearing bush 189 and also the springs 197 in the cap 199 (fast on the upper spindle) which press the carefully faced washer down on to the bush 191 there being an oil retaining washer 203 on the lower side of the bearing pressed up by springs 205 inside a guard casing 207.

The drums operate in pairs, the drums of each pair rotating, practically in contact, in opposite directions and so that material fed into the bite of the drum pair is carried towards the axis of the casing.

The drums are thus driven by intermeshing pinions one fast on each of the spindle in the chamber 13 and one of which, 41 (Figure 1), is connected by a spider frame 43 to a shaft 45 passing through a stuffing box 47 to carry, outside the casing, a worm wheel 49 driven by a worm 51 itself driven from a line shaft 53 (Figure 3) through a variable speed gear 55 of which there is one for each effect.

A supply channel for the material to be spread on the drums as a film by the approach of the surfaces of the pair is formed along the bite of the drums by a member 213 (Figure 2), conveniently of wood, extending lengthwise of the drum axes and having its longitudinal margin appropriately bevelled so that when it is pressed towards the bite of the drums by the adjustment of its support 215, 217, radially of the casing these margins seal the space between the member 213 and the drums and the sharp edges 215* of the member act as scrapers (avoiding the use of separate scrapers which may, however, be used if desired) to remove the dried material from the drum. The upper and lower ends of the channel are also sealed by plane members 223 (Figure 3), carried by the support 215, 217 and pressed by members 225 and springs 227 axially of the drums into rubbing contact therewith. The support 215, 217 is adjustable to and from the bite of the drums from outside the casing by screws 233, and springs 235 act to take up lost motion and to press the member 213 at all times towards the drums. Any adjustment shown to be necessary by inspection of the drum surfaces, through windows in the casing, during operation may therefore be quickly made.

The material to be dried (say peat pulp of a water-content of 90% or thereabouts) is supplied to this channel through a duct 219 passing through the casing from a valve 231 and through the support 215 into the lower end of the channel there being an appropriate expansion joint 229 between these parts, A sweep 69 (Figure 1) is secured to the bottom of each drum to sweep the dried product, which falls to the bottom of the space 15, into the duct 23.

The space in which the dried product falls from the drums under the scraping action of the member 213 is preferably isolated as far as possible from the main space 15, wherein the bulk of the vapor is evolved from the material, by the provision of partitions 237 (Figure 2) fast on the casing and extending almost into contact with the drums and a quiescent zone comparatively free from vapor is formed and any tendency for flocculent or fine dried product scraped from the drums to be dispersed in the casing is reduced.

The steam or vapor entry to each chamber 11 is controlled by a damper 239 (Figure 4) operated through appropriate linkage from a rod 245 fast to a diaphragm 247 forming part of the side wall of the chamber 11, the arrangement being such that upon a rise in pressure in the chamber 11 the damper throttles the flow of vapor into the chamber. The action of the diaphragm can be modified by variation of the position of a weight 249 along an arm of a bell crank lever 251 acting on the rod 245.

The provision of the valve 153 and of a valve 155 on the vapor duct leading from the space 15 and of a valve 157 in a duct joining the vapor inlet and outlet pipes of the effect allow of any effect being wholly or partially isolated from the system at will.

The automatic throttles in a large measure eliminate one of the variables entering into the control of the drying operation (i. e. the temperature difference gradations in the series of effects) and makes it easier for an unexpected local disturbance of the conditions, as of the heat transmitting capacity of the surface in one of the effects or inadequate filming thereon, to be dealt with by control of the variable speed gear or by the valves 153, 155 and 157 of one or more of the effects, or otherwise.

The automatic discharger 25 (Figure 1) may be of the kind wherein a continuously rotating disc valve-plug presents a product-receiving pocket first to the duct 23 and then to a duct 105 so that there is a steady intermittent discharge of product without loss of vacuum or pressure in the casing. The ducts 105 discharge into a trunk 107. A conveyor 111 advances the product along the trunk 107 to a rotary discharger of the character already indicated by which the product finally leaves the system. Generally, the operation will be conducted so that the dried product at the time when it is scraped off the drums has substantially the same water content (of say, in the case of peat, 30%) at each effect but this is not essential and as long as the material has reached an apparently dry state in which it can be dealt with as a solid the advantages of the invention can be obtained even with a substantial variation between the water contents of the products from different of the effects.

Eccentric or other adjusting means may be provided as indicated at 211 in Figure 2 for the top and bottom bearings of one drum of each pair to enable the distance between the drums to be slightly varied or adjusted to deal with wear or to control the film thickness.

I claim:—

1. A drying apparatus comprising two casings, a hollow drying drum in each, a duct connecting the space within one of the casings with the inside of the drum in the other casing, means for applying material to be dried to the surface of each drum at a determinate portion of its periphery, means for removing such material from each drum at another portion of its periphery, and two devices for discharging material from the apparatus whereof one is associated with each of the aforesaid two casings and each of which devices is fed solely by the corresponding one of said removing means.

2. In a drying apparatus, a casing, a rotatable drying drum in said casing, a partition in the casing closing off the drum space of the casing from a vapor space at one end of the drum space, a hollow spindle for the drum extending through an opening in said partition and establishing communication between the inside of the drum and said vapor space, and a gland between the spindle and the partition to interrupt communication between the aforesaid drum space and vapor space.

In testimony whereof I have signed my name to this specification.

THOMAS RIGBY.